(12) United States Patent
Hicks et al.

(10) Patent No.: US 11,051,125 B2
(45) Date of Patent: Jun. 29, 2021

(54) SYSTEMS AND METHODS FOR UPDATING AND USING GEOFENCE DATA TO TRIGGER DELIVERY OF MESSAGES

(71) Applicant: Braze, Inc., New York, NY (US)

(72) Inventors: Matthew Hicks, New York, NY (US); Jared Poelman, Long Island City, NY (US); Brian Wheeler, New York, NY (US); Kevin Wang, New York, NY (US)

(73) Assignee: Braze, Inc., New York, NY (US)

( * ) Notice: Subject to any disclaimer, the term of this patent is extended or adjusted under 35 U.S.C. 154(b) by 0 days.

(21) Appl. No.: 16/678,657

(22) Filed: Nov. 8, 2019

(65) Prior Publication Data
US 2021/0144509 A1 May 13, 2021

(51) Int. Cl.
| | |
|---|---|
| *H04W 4/021* | (2018.01) |
| *H04W 4/029* | (2018.01) |
| *H04L 29/08* | (2006.01) |
| *H04W 4/02* | (2018.01) |
| *H04W 68/00* | (2009.01) |
| *H04W 64/00* | (2009.01) |

(52) U.S. Cl.
CPC .......... *H04W 4/021* (2013.01); *H04L 67/18* (2013.01); *H04L 67/26* (2013.01); *H04W 4/023* (2013.01); *H04W 4/029* (2018.02); *H04W 64/00* (2013.01); *H04W 68/005* (2013.01)

(58) Field of Classification Search
CPC ..... H04W 4/021; H04W 4/029; H04W 4/023; H04W 64/00; H04W 68/005; H04L 67/18; H04L 67/26
See application file for complete search history.

(56) References Cited

U.S. PATENT DOCUMENTS

| | | | |
|---|---|---|---|
| 2013/0045760 A1* | 2/2013 | Obermeyer | G08B 21/0277 455/456.6 |
| 2017/0220753 A1* | 8/2017 | Guthrie | G16H 40/63 |
| 2019/0098448 A1* | 3/2019 | Jain | H04W 4/021 |
| 2019/0279181 A1* | 9/2019 | Kelly | G06Q 20/12 |
| 2019/0335294 A1* | 10/2019 | Sorden | G06T 11/206 |

* cited by examiner

*Primary Examiner* — Wayne H Cai
(74) *Attorney, Agent, or Firm* — FisherBroyles, LLP

(57) ABSTRACT

Systems and methods for causing messages to be presented to users involve updating and using geofencing data to determine whether and when to present a message to a user via a user computing device. Geofencing data that defines the closest relevant geofences to the current position of a user computing device can be provided to a software application on the user computing device on a periodic basis, or when the software application is loaded and run. The software application can then register the geofences with an operating system of the user computing device. When the user computing device determines that the user computing device has entered a geofence, this information can be used to determine whether to present the user with a message.

17 Claims, 11 Drawing Sheets

SYSTEMS AND METHODS FOR UPDATING AND USING GEOFENCE DATA TO TRIGGER DELIVERY OF MESSAGES

BACKGROUND OF THE INVENTION

The invention is related to systems and methods for enhancing customer engagement. In part, this is accomplished by sending messages to users. The messages could be mobile or browser-based push notifications, text (SMS/MMS) messages, email messages, in-application messages, or an audio recording that is sent to users via a telephony system. Such messages are delivered to a user via a user's computing device. The present invention is focused on using geofencing to determine whether and when to deliver a message to a user.

Companies also often engage a customer engagement service to help manage the delivery of messages to their customers. The customer engagement service can help control the flow and timing of messages to provide the customers with an enjoyable and informative experience. For example, some customers that are highly engaged with a company may wish to receive messages from the company on a frequent basis. Conversely, customers that are not highly engaged with the company may find frequent messages from the company undesirable. The customer engagement service can help determine what individual customers desire, and then manage the flow of messaging to customers based on their individual desires.

The customer engagement service can also cause messages to be delivered to customers at opportune times when the messaging may have the most influence over customer behavior. Similarly, the customer engagement service may know when certain types of message will have the greatest value to customers, and then seek to deliver the messages at those times.

Companies often provide a software application to their customers that the customers install on a computing device such as a laptop computer, a desktop computer, a tablet or a smartphone. The software applications can provide a wide array of functionality or information to customers depending on what types of goods and services the company provides to its customers. For example, an online retailer may provide its customers with a software application that makes it easy for customers to make online purchases. A media company may provide its customers with a software application that makes it easy for the customers to access and watch media content.

Regardless of the type of software application that a company provides to its customers, it is often possible to deliver messages to the customers via the software application while they are using the company's software application. Such messages are referred to as in-application or "in-app" messages.

One way that the customer engagement service can control the delivery of in-application messages to users is via "campaigns." The company or the customer engagement service can configure a campaign to deliver specific in-application messages to a user upon the occurrence of one or more specific triggering events. One type of triggering event can be the user's computing device entering a bounded geographical region.

Geofencing refers to establishing a bounded geographical region, and then determining when a user or a user computing device enters or leaves that bounded geographical region. The bounded geographical region is referred to as a geofence. Typically, a user's computing device itself determines when the computing device has entered or left a geofence. This requires that the user computing device be informed of the bounds of one or more geofences, and that the user computing device be capable of determining when the user computing device has entered or left one of the geofences by comparing the current position of the user computing device to the boundaries of known geofences.

Mobile computing devices, such as smartphones, tablets and laptop computers are by their nature portable and expected to move about. There are limitations on the amount of geofencing data that can be stored on such a device to identify different geofences. There are also limitations on the ability of such mobile computing devices to compare its current location to a large number of geofences to determine when the mobile computing device has entered or left a geofence. As a result, the operating systems of most mobile computing devices limit the number of geofences that a software application on the mobile computing device can register with the operating system and that can be used to trigger a geofencing notification to the software application when the mobile computing device enters or leaves a geofence.

A software application on a mobile computing device must be informed of what geofences are deemed relevant so that the software application can in turn register the geofencing information with the operating system on the mobile computing device. Ideally, the software application would be updated with new geofencing information as the mobile computing device moves from one location to another, so that the geofences surrounding the mobile computing device's current location are the ones registered with the operating system of the mobile computing device. Unfortunately, constantly requesting and receiving new geofencing information, and then registering the new geofencing information with the operating system can drain the battery of the mobile computing device. Also, some operating systems place limits on how and how often a software application can gain access to the current location of the mobile computing device, which is needed to obtain the most relevant geofencing data. These limitations make it difficult for a software application on a mobile computing device to maintain an updated list of relevant geofences.

DETAILED DESCRIPTION OF PREFERRED EMBODIMENTS

The following detailed description of preferred embodiments refers to the accompanying drawings, which illustrate specific embodiments of the invention. Other embodiments having different structures and operations do not depart from the scope of the present invention.

Systems and methods embodying the invention can be part of a customer engagement service. As mentioned above, a customer engagement service helps a company interact with its users to enhance the customer experience and to increase the company's business, revenue, and/or stature. One of the ways that a customer engagement service assists a company is by helping the company to manage how and when messages are delivered to the company's customers.

The following description refers to "clients" and to "users". For purposes of this discussion, a "client" would be a client of the customer engagement service. In other words, a client is a company or business that is being assisted by the customer engagement service. "Users" are a client's users, not users of the customer engagement service. The customer engagement service sits between a client and the client's users to manage and orchestrate the delivery of messages sent from the client to its users.

A "message" could take many different forms and be delivered to a user in many different ways. For example, a "message" could be a mobile or browser-based push notification sent to users by a push notification service.

A message could also be an in-app message that is delivered to a user via a client's software application. The client's software application could be resident on a user's computer, a user's smartphone or any other device with a processor that is capable of running such a software application. The in-app messages generated and/or delivered by such a software application could be received by the user in various ways.

A message also could be a text message (SMS/MMS) that is delivered to users via a smartphone or via a text messaging software application. A message also could be a message delivered to a user via a social media service, or via an Over The Top (OTT) messaging service. A message also could be an email message that is delivered to users via standard email service providers. Moreover, a message could be an audio message delivered to a user via a telephony or VOIP service provider, or a video message delivered via similar means.

For purposes of the following description and the appended claims, any reference to sending a "message" to users is intended to encompass any of the different types of messages and delivery channels mentioned above, as well as any message types and delivery means that are developed in the future.

Figure 1:
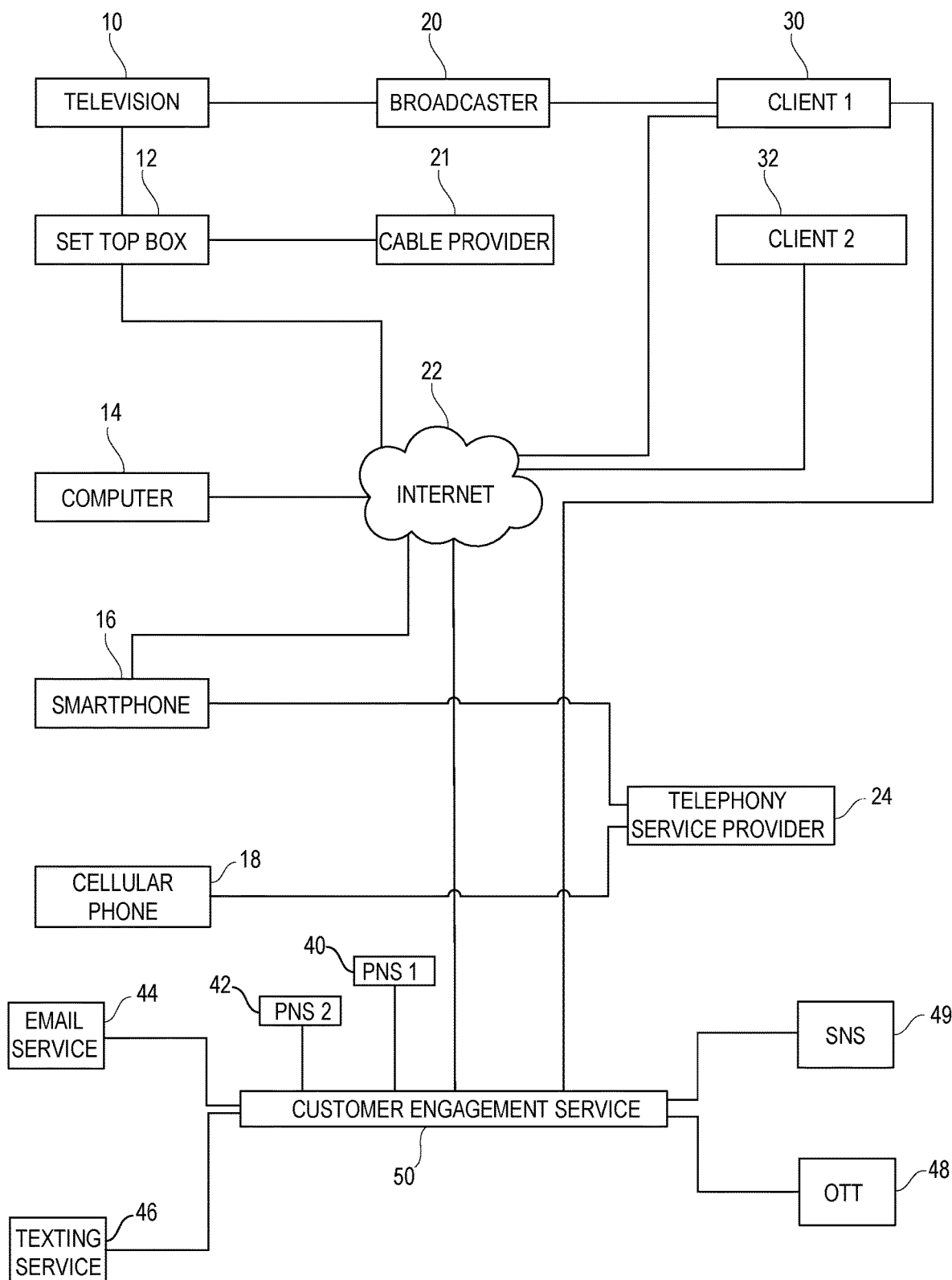
FIG. 1 is a diagram of a communications environment which could be utilized by systems and methods embodying the invention.

FIG. 1 illustrates a communications environment in which systems and methods embodying the invention could be practiced. As shown in FIG. 1, the communications environment includes client one 30, client two 32 and the customer engagement service 50. Client one 30 and client two 32 are clients of the customer engagement service 50. The clients 30/32 can communicate with the customer engagement service directly, via the Internet 22, or via other means.

Users of the clients 30/32 could utilize the clients' 30/32 services in various ways. For example, if client one 30 is a media company that provides media content to its users, client one 30 could produce media content that is sent via a broadcaster 20 to a client's television 10. That media content could be delivered to the user's television 10 via a set top box 12 that is connected to the user's television and to the Internet 22 and/or a cable service provider 21. In some instances, a software application on the set top box 12 that is provided by client one 30 could be used to deliver the content to the user's television 10.

The same or a different user might have a computer 14 that is connected to the Internet 22. The user could utilize a web browser on the computer 14 to access an Internet website provided by client one 30 that also offers media content. Similarly, a software application provided by client one 30 and that is resident on the user's computer 14 might also be used to access media content provided by client one 30 via the Internet 22.

Yet another user may have a smartphone 16 that is capable of communicating over the Internet 22 and/or via a telephony service provider 24. A software application provided by client one 30 and that is resident on the user's smartphone 16 could be used to access media content provided by client one 30 via the Internet 22 or via the telephony service provider 24.

Still another user might have a cellular telephone 18 that is capable of receiving text messages. This would allow the user of the cellular telephone to receive text messages from client one 30.

FIG. 1 also shows that a first push notification service (PNS) 40 and a second push notification service 42 could be used by the customer engagement service 50 to deliver push notifications to smartphones and/or web browsers. Such messages could be delivered by the push notification services 40/42 to user smartphones via the Internet 22 or via a telephony service provider 24 that provides user smartphone with its native telephony service.

FIG. 1 also shows that an email delivery service 44 could be used by the customer engagement service 50 to send email messages to users. Further, the customer engagement service 50 could use a text messaging service 46 to send text messages to users, or an OTT messaging service 48 to send formatted messages to users. Moreover, the customer engagement service 50 might send a message to users via one or more social networking services 49. Of course, the customer engagement service 50 could utilize any other message delivery service as well to communicate messages to users.

The clients 30/32 in this communications environment could be any sort of client that utilizes a customer engagement service 50 to help them manage engagement with their users. As noted above, a client could be a media broadcaster that produces and sends media content to its users. In other instances, a client could be a retailer whose purchasers are its users. In still other instances, the client could be a service provider, such as a telephony service provider or an Internet service provider. Virtually any business that wishes to send messages to its users could be a client in this environment.

One of skill in the art will appreciate that FIG. 1 only illustrates a very limited number of devices that would be used by users to receive messages from a client, and that could be used to interact with a client. In reality, there would be a very large number of user devices in such a communications environment. Also, a single user could possess and use multiple devices to access a client's services and to receive messages from a client. Thus, the depiction in FIG. 1 should in no way be considered limiting.

Figure 2:
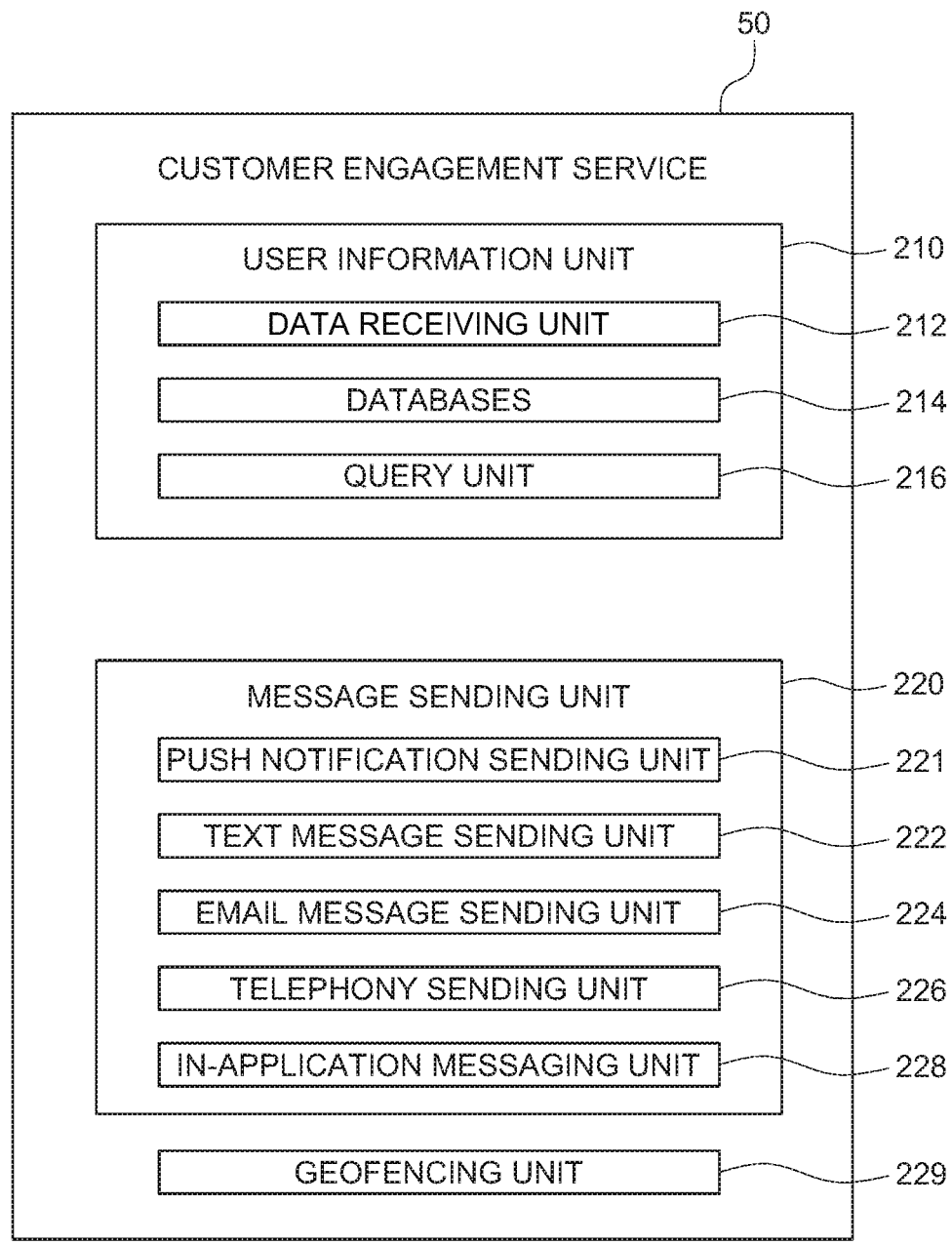
FIG. 2 is a diagram of selected elements of a customer engagement service.

FIG. 2 illustrates selected elements of a customer engagement service 50. The illustration in FIG. 2 is in no way intended to show all elements of a typical customer engagement service 50, and indeed there would typically be many other elements. Likewise, a customer engagement service 50 embodying the invention might not have all the elements illustrated in FIG. 2.

The customer engagement service 50 includes a user information unit 210 that is responsible for receiving and storing information about a client's users, and that is responsible for responding to requests for that stored information. The user information unit 210 includes a data receiving unit 212 that receives various items of information about users, and that stores that received information in databases 214. The information could be received from various sources. However, typically a client would provide information about its users to the data receiving unit 212 via various means.

For example, in some instances a client may send notifications to the data receiving unit 212 each time that one of the client's users engages with the client in some fashion. For example, if the client is an online retailer, each time that a user makes a purchase from the online retailer, the online retailer could send the data about the purchase made by that user to the data receiving unit 212. As will be explained below, information received by the data receiving unit 212 may satisfy a trigger for causing an in-application message to be presented to a user.

In another example, if the client is a media broadcaster, and one of the media broadcaster's users logs onto a website provided by the media broadcaster to access media content, the media broadcaster could send data about that contact to the data receiving unit 212. The data sent could include an identification of the user, the time that the user accessed the website and an indication of what the user accessed or watched while logged into the website. Similarly, any time that a user accesses a client's website, the client could automatically report that user activity to the data receiving unit 212 of the customer engagement service 50.

In yet another example where the client is a media broadcaster, the media broadcaster could have provided a software application to a user that the user has loaded onto a smartphone or a computing device. The software application could be configured to report the actions that a user takes when using the software application directly to the data receiving unit 212 of a customer engagement service 50. Indeed, in any instance where the client has provided a software application to its users, the software application could be configured to report user activity to the data receiving unit 212 of the customer engagement service 50.

Because clients and software applications that the clients provide to their users all report user activity to the customer engagement service 50, the customer engagement service 50 is able to build a detailed picture of each user, the user's preferences, and the user's typical courses of action.

In addition, because the customer engagement service 50 is tasked by its client with the delivery of messages to the client's users, the customer engagement service 50 is also able to build up a record of how and when individual users react to a sent message. This could include an indication of when a user opens a sent message after delivery, and whether and when the user takes an action in response to receipt of a message. For example, because the data receiving unit 212 is also receiving information from the client regarding a user's contacts with the client, the customer engagement service 50 may learn that shortly after an individual user received a message from the client, the user logged into the client's website, or that shortly after the user received a message, the user opened a software application provided by the client. For all of these reasons, the customer engagement service 50 is able to build detailed user profiles that can be used to predict how individual users will act in certain situations, or how they will respond to certain forms of messaging.

As shown in FIG. 2, the user information unit 210 also includes a query unit 216. The query unit 216 queries the databases 214 to obtain various information about the users.

The customer engagement service 50 also includes a message sending unit 220. The message sending unit 220 is responsible for sending messages to a client's users. As explained above, messages could take many different forms and have many different delivery channels. The message sending unit 220 includes a push notification sending unit 221 that causes mobile or browser-based push notifications to be sent to users via one or more push notification services 40/42, as illustrated in FIG. 1. The push notification sending unit 221 may obtain telephone numbers and push notification service credentials for individual users from the databases 214 with the assistance of the query unit 216. Alternatively, the client may provide that information to the message sending unit 220. The user credential information is then used to cause one or more push notification services 40/42 to deliver a message to the users.

The message sending unit 210 may also include a text message sending unit 222 that causes text-based messages to be sent to users. The text-based messages could be traditional SMS/MMS messages, or messages that are delivered to users via an OTT messaging service or perhaps a social networking service. Information needed to send such text-based messages to users may also be obtained from the databases 214 of the user information unit 210, or that information may be provided by the client. Here again, the message sending unit can enlist the services of one or more text-based message delivery platforms to actually send the message to users.

The message sending unit 220 may also include an email message sending unit 224 that causes email messages to be sent to users. The email message sending unit 224 may obtain email addresses and other information, such as user names, for individual users from the databases 214 with the assistance of the query unit 216, or that information may be provided by the client. The information is then used to send email messages to users. The email messages may be delivered to users by one or more third party email services.

The message sending unit 220 may also include a telephony sending unit 226 that is responsible for delivering audio messages to users via a telephony system. For example, the telephony sending unit 226 could generate an audio recording of a message that is to be delivered to users, or the telephony sending unit 226 could receive such an audio message directly from the client. The telephony sending unit 226 would then obtain information about individual customers from the databases 214 with the assistance of the query unit 216, such as user telephone numbers and user names, or that information could be provided by the client. The telephony sending unit 226 would then enlist the aid of an outside service to deliver the audio message to users via a traditional or VOIP telephony system.

In some instances, the telephony sending unit 226 could generate and operate interactive voice response (IVR) applications to deliver such audio messages to users. Doing so may allow a user to request and receive information or services in addition to the original audio message. If a user does interact with an IVR application, how the user interacts with the IVR application could also be recorded in the databases 214 as additional information about the user.

The message sending unit 220 further includes an in-application messaging unit 228. The in-application messaging unit 228 is responsible for causing messages to be delivered to a user via a client's software application that it provides to its users. For this reason, the in-application messaging unit 228 can interact with an instantiation of a client's software application that is resident on a user's computing device, as will be explained in detail below.

The foregoing and following descriptions refer to "campaigns." A campaign is a designed to deliver one or multiple messages to one or more users upon the occurrence or satisfaction of one or more trigger conditions. Most relevant to this application, a trigger condition that causes a message to be presented to a user could be the user's computing device crossing the boundary of a geofence.

A client or the customer engagement service 50 can setup and configure a campaign to present specific messages to one or more users upon the occurrence of one or more trigger conditions being satisfied. The message that is presented could be a predetermined message. Alternatively, the message could be generated using a template that is completed with acquired information. The information that is inserted into a message template could be specific to the user to which the message is presented, or it could be more general in nature.

Part of setting up or configuring a campaign is establishing the trigger conditions that must occur in order for the campaign to deliver a message to one or more users. In some instances, only a single trigger condition need be satisfied for a campaign to deliver a message to one or more users. In other instances, multiple trigger conditions must all occur before the campaign will cause a message to be presented to one or more users. As will be explained below, boolean logic can be used to define a set of trigger conditions that must be satisfied before a campaign will cause a message to be sent to one or more users.

A campaign could be implemented by the message sending unit 220 of the customer engagement service 50. Alternatively, a campaign may be implemented by elements of a software application 300 that is running on a user's computing device.

Information relating to a user's activities may be provided to or reported to the message sending unit 220 by a client, by a client's software application on a user computing device or by a third-party server. For example, a client's server may report that a user has made a purchase from the client, and that information could be delivered to or reported to the in-application messaging unit 228. The fact that the user made a purchase from the client could satisfy a trigger for a messaging campaign that causes an in-application message to be presented to the user. In another example, a user computing device crossing the boundary of a geofence could satisfy a trigger for a messaging campaign that causes a message to be presented to a user. In these examples, a user's activity satisfied a trigger for a message campaign. However, in other instances the receipt of other types of information not related to user activity might also satisfy a trigger of a message campaign.

The customer engagement service 50 also includes a geofencing unit 229. The geofencing unit 229 is responsible for tracking the geofences that clients would like to use in connection with triggering the delivery of messages. The geofencing unit 229 is also responsible for updating a client software application on a user computing device with information about the geofences that are most relevant to the current location of the user computing device, as will be explained in more detail below.

Figure 3:
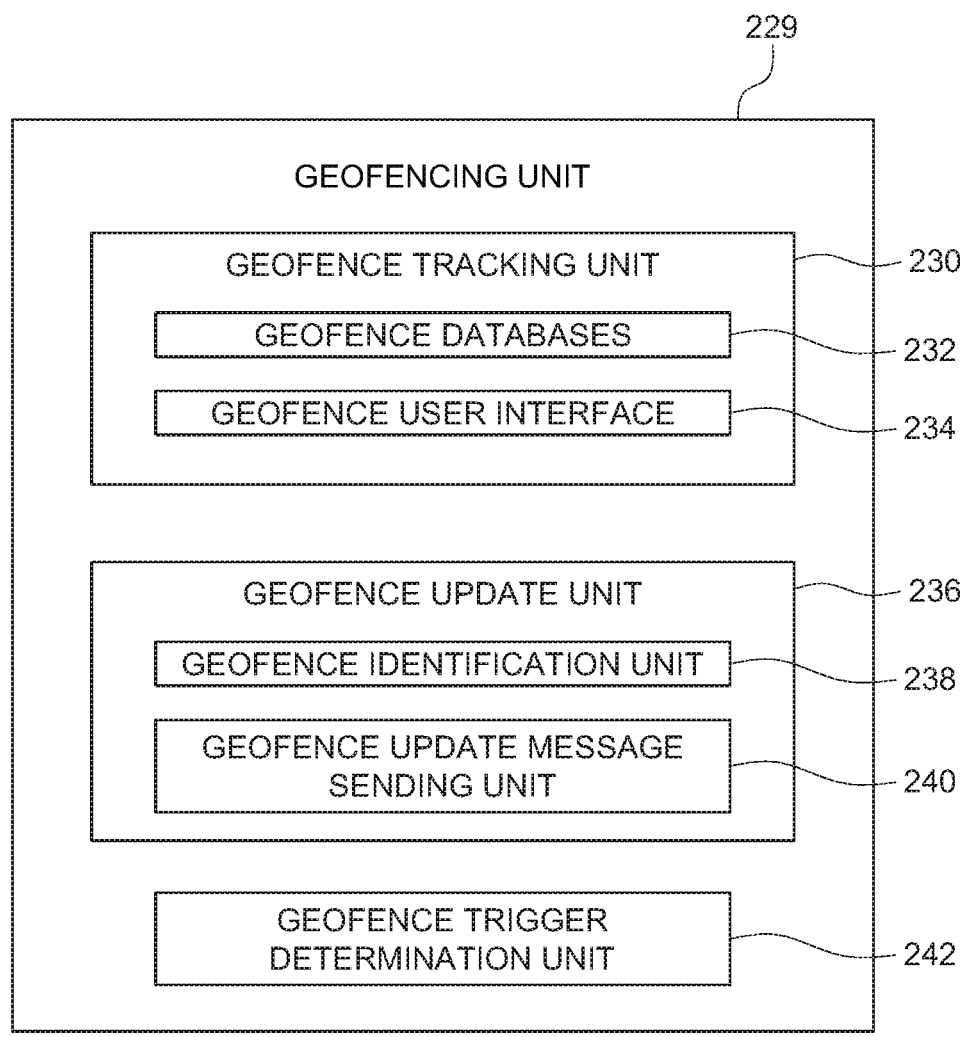
FIG. 3 is a diagram illustrating selected elements of a geofencing unit that is part of a customer engagement service.

FIG. 3 provides a more detailed diagram of selected elements of a geofencing unit 229 that could be part of a customer engagement service 50. The geofencing unit 229 includes a geofence tracking unit 230 that is configured to maintain information about the geofences that each client of the customer engagement service 50 would like to use to help trigger the delivery of messages to its customers.

The geofence tracking unit 230 includes geofence databases 232 that include information on the geofences. This information can include identifiers for the geofences and information that defines the boundaries of each geofence, as well as other information. In some embodiments, each geofence is defined by a location and a radius around that location. The location could be expressed as a longitude and latitude, or via some other means. Of course, the boundaries of geofences could be defined in other ways. For example, the boundaries of a geofence could correspond to the boundaries of a city, a county or a state.

The geofence tracking unit 230 also includes a geofence user interface that allows a client to input information about the geofences that the client would like to use to trigger the delivery of messages to the client's users. Information about geofences entered by clients via the geofence user interface 234 is then stored in the geofence databases 232.

The information in the geofence databases 232 could be organized on a client-by-client basis or on a geographical basis or in some other fashion. However, the information on geofences contained in the geofence databases 232 will identify the client or clients who wish use each geofence.

The geofence unit 229 also includes a geofence update unit 236 that is responsible for providing geofence information to client software applications on user computing devices. The geofence update unit 236 receives a geofence update request from a software application on a user computing device that includes the current location of the user computing device. A geofence identification unit 238 then identifies a predetermined number of the geofences closest to the user computing device's current position. A geofence update message sending unit 240 then sends a geofence update message to the software application on the user computing device that includes information about the predetermined number of geofences identified by the geofence identification unit 238. The information in the geofence update message can include geofence data items for each geofence that include an identifier for the geofence and information about the boundaries of the geofence. For example, the geofence boundary information in each geofence data item could include a center location of the geofence and a radius of the geofence.

The geofence unit 229 could also include a geofence trigger determination unit 242 that is configured to determine whether a trigger condition for presentation of a message is satisfied when a user computing device crosses a geofence boundary. The geofence trigger determination unit 242 can receive a trigger message from a client's software application on a user computing device that is sent when the user computing device determines that it has crossed the boundary of a known geofence. The geofence trigger determination unit 242 could then use information that it maintains to determine if that action should trigger the presentation of a message to a user of the user computing device. In some embodiments, the geofence trigger determination unit 242 may consult with one or more elements of a message sending unit 220 to determine if the activity of crossing the boundary of the geofence should trigger the presentation of a message to the user of the user computing device.

FIG. 3 is intended to illustrate only selected elements of a geofence unit 229 of a customer engagement service 50. Other embodiments of a geofence unit 229 may not include all the elements shown in FIG. 3. Also, some embodiments of a geofence unit 229 may include elements not shown in FIG. 3. Thus, the depiction in FIG. 3 should in no way be considered limiting.

Figure 4:
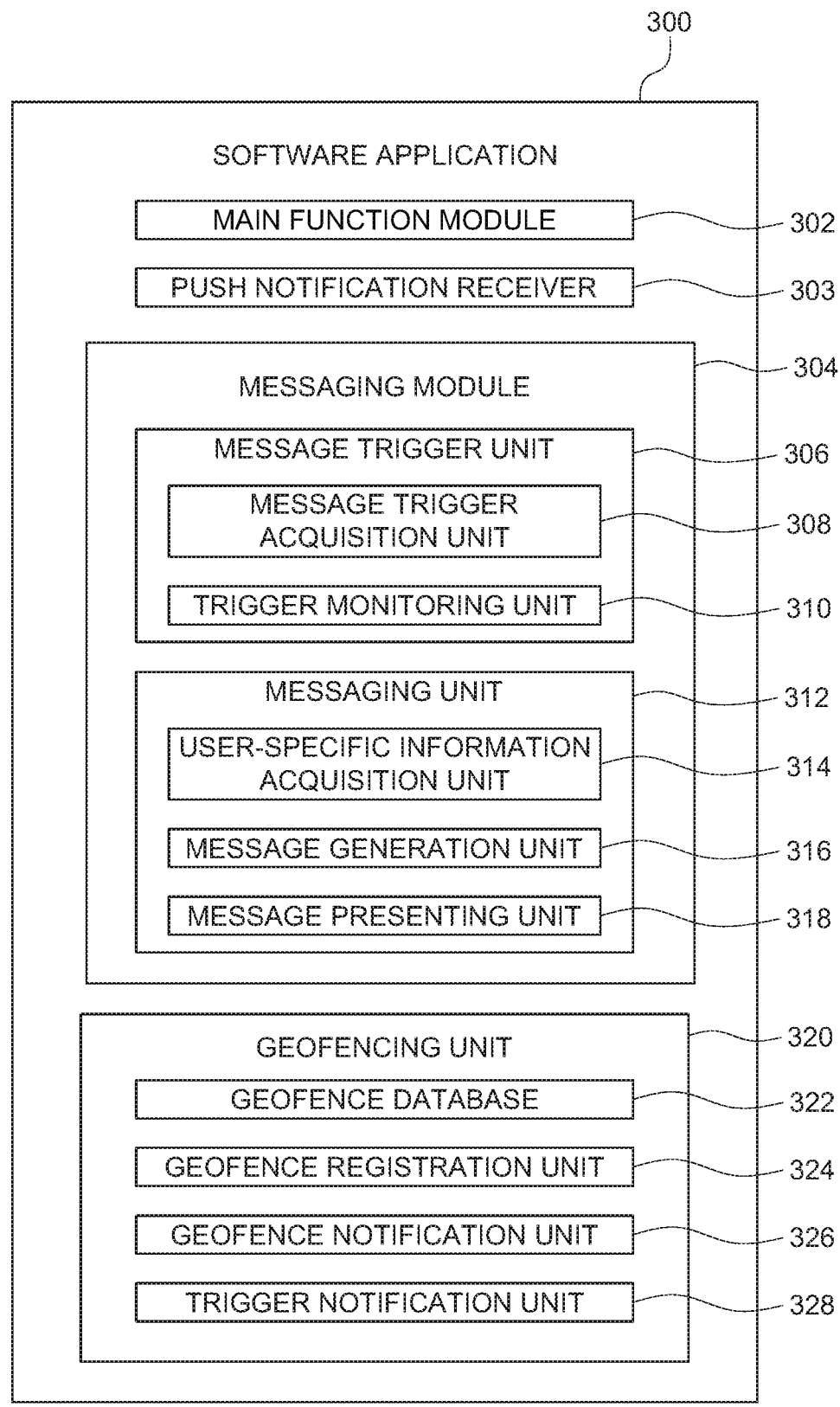
FIG. 4 is a diagram illustrating various elements of a company's software application that is provided to the company's customers.

FIG. 4 illustrates selected elements of a client's software application that would be provided to the client's customers or users. The software application 300 includes a main functions unit 302, which provides one or more functions to the user. The actual function(s) would vary greatly from client to client. For example, if the client is an online retailer, the main functions unit 302 could be configured to allow a user to make online purchases. If the client was a media company, the main functions unit 302 could provide the user with a way of accessing and watching media content provided by the client.

The software application 300 also includes a push notification receiver 303. The push notification receiver 303 is configured to receive push notifications that have been sent by one or more push notification services 40/42 at the request of a customer engagement service 50, or some other party. In some embodiments, information extracted from a push notification by elements of a user's computing device are passed to the push notification receiver 303. The push notification receiver 303 may then pass along information and messaging instructions included in the received push notification to a messaging module 304 or a geofencing unit 320 of the software application.

Messaging instructions included within a push notification may be sent to a user's computing device to cause the messaging module 304 of the software application 300 to present a message to a user. The message that is ultimately presented to the user could be an in-application message, or some other form of message.

The messaging module 304 includes a messaging unit 312 that is configured to cause a message to be played or displayed to the user when one or more trigger conditions are satisfied. A message trigger acquisition unit 308 of a message trigger unit 306 can receive information about the trigger conditions that must be satisfied before a message is presented to the user. The information about the trigger conditions could be received via a push notification. Alternatively, the message trigger acquisition unit 308 may communicate with the message sending unit 220 of a customer engagement service 50 to obtain information about the trigger conditions under which a message is to be displayed/played to the user. A trigger monitoring unit 310 monitors those conditions to determine when the trigger conditions for a message have been satisfied such that it is time to display/play a particular in-application message to the user.

Information about a message that is to be presented to a user, and the associated trigger conditions that must be satisfied before the message is presented to the user could also be received by the software application in other ways. For example, when the software application 300 is first run on the user's computing device, it could register with the customer engagement service 50. Part of that registration process could include receiving data communications from the customer engagement service 50 that provide messaging instructions. In still other instances, the message sending unit 220 of the customer engagement service could send messaging instructions to the software application long after registration has occurred when the message sending unit 220 determines that a new message should be presented to the user.

In some instances, information about a message that is to be presented to a user may be stored in the messaging unit 312. In other instances, the messaging unit 312 may obtain all or a portion of a message from the message sending unit 220 of the customer engagement service 50. In some instances, a message generation unit 316 may generate a message using a message template and acquired information. In other instances, the messaging unit 312 may obtain the entire message that is to be displayed or played to a user from the message sending unit 220 of the customer engagement service 50, from the client that provided the software application 300, or from a third party. Regardless of whether the message is pre-stored in the messaging unit 312, obtained or generated, a message display unit 318 causes the message to be displayed/played to the user.

In some instances, a user-specific information acquisition unit 314 obtains user-specific information about the user, and the message generation unit 316 then generates a message using the obtained user-specific information.

As mentioned above, the message that is ultimately displayed/played to the user may be generated using a message template. The message template can be created by the client that provided the software application 300, or by the customer engagement service 50. In simple examples, a message template is configured such that customer-specific information, or other forms of information, can be inserted into the message template to generate a personalized or customized message.

A message template can also include sections that will be completed or filled in by evaluating conditional statements or boolean logic-based statements. The conditional statements or boolean logic-based statements can seek information from the customer engagement service 50, the client that provided the software application or from a third-party source in order to determine whether and/or how to complete a portion of a message template, to thereby generate a message that can be played to displayed to a user.

For example, a portion of the message template may call for an image to be displayed, where the image is intended to represent the prevailing weather at the user's present location. For this to work, conditional statements or boolean-logic-based statements in this portion of the message template are used to determine where the user is presently located, and then the prevailing weather at that location. Then, based on the prevailing weather, a suitable image is obtained and inserted into the message.

The way in which a message trigger is satisfied may also be relevant and used to determine what information to insert into a message template to generate a message that will be displayed or played to the user. For example, if the message trigger is the user playing a video, the type of video that the user played may be used to determine how to generate the message that is ultimately generated and displayed or played to the user. As a result, when the user-specific information acquisition unit 314 requests user-specific information that is needed to generate a message, that request may provide information about how the message trigger was satisfied. The entity that then provides the user-specific information may use the information about how the trigger was satisfied to determine what sort of user-specific information to provide back to the user-specific information acquisition unit 314.

The message trigger itself may include conditional statements or boolean logic-based statements that control what happens when a message trigger is satisfied. For example, if the message trigger is the user playing a video, the message trigger could further specify that if the user played a video relating to sports, the user-specific information acquisition unit 314 should seek user-specific information from entity X, whereas if the user plays a video relating to nature, the user-specific information acquisition unit 314 should seek user-specific information from entity Z.

The conditional statements and boolean logic-based statements within a message template can even determine whether a message is to be displayed or played to the user. For example, a message template may include a conditional statement or boolean logic-based statement that indicates that under certain conditions the message should be displayed to the user, and under certain other conditions the message should not be displayed to the user.

Because the message triggers of a campaign and the message templates can utilize conditional statements and boolean logic-based statements to determine when to deliver a message to a user, and whether and how to generate a message for a user, highly sophisticated personalization for individual users can be achieved. Personalization that goes far beyond simply inserting user-specific characteristics or data (such as a user's name or address) into a message template.

The foregoing and following descriptions refer to information specific to a user, or user-specific information. Those phrases are intended to encompass simple user characteristic data, such as the user's name and physical characteristics. However, those phrases are also intended to encompass data that is obtained or determined or generated by evaluating conditional statements or boolean logic-based statements within a message template or message trigger. Evaluating the conditional statements and/or boolean logic-based statements may require using simple user characteristics to determine whether and how to generate the message for the user. However, in other instances, no user characteristic data may be needed to evaluate a conditional statement or boolean logic-based statement. Regardless, for purposes of the following discussion, the phrases information specific to a user and/or user-specific information is intended to encompass data that is obtained or determined or generated by evaluating conditional statements or boolean logic-based statements within a message template or message trigger.

The geofencing unit 320 of the software application 300 is configured to handle updates of geofencing information, and to act when the user computing device crosses a boundary of a geofence to determine if a message should be displayed to a user of the computing device.

The operating systems of most mobile computing devices will only allow a software application to register a limited number of geofences that the mobile computing device then tracks to determine when the mobile computing device has crossed the boundary of a geofence. Once the software application has registered geofence information with the operating system, the operating system will provide a notification to the software application when the mobile computing device crosses the boundary of one of the registered geofences. The geofencing unit 320 includes a local geofence database 322 that contains information on a limited number of geofences. The number of geofences stored in the local geofence database 322 will typically correspond to the number of geofences that the operating system of the mobile computing device will allow the software application 300 to register with the operating system.

The geofence unit 320 will send geofence update requests to the geofence update unit 236 of a customer engagement service 50 to obtain updated information on the geofences that are located closest to the mobile computing device's present location. Geofence update requests, which would include the present location of the mobile computing device, could be sent to the geofence update unit 236 periodically, such as once a day. Alternatively, a geofence update request could be sent each time the software application is opened, or each time that the software application is brought to the foreground of the operating system. Also, if the user computing device upon which the software application 300 is running moves a significant distance since the last update of the local geofence database 322, that could also trigger an update of the data stored in the geofence database 322.

The geofence unit 320 then receives geofence update messages from the geofence update message sending unit 240 of the customer engagement service 50 that include information on the geofences closest to the mobile device's present location. That geofence information is then stored in the local geofence database 322 maintained by the software application 300.

A geofence registration unit 324 of the geofencing unit 320 registers geofences with the operating system of the mobile computing device. Registration includes providing the operating system with an identifier of each geofence, and information about the boundaries of the geofence.

Once registered, the operating system will send a notification to the geofence notification unit 326 whenever the mobile computing device crosses a boundary of one of the registered geofences. The notification will provide the registered identifier of the geofence boundary that was crossed, and an indication of whether the mobile computing device passed into the boundary or passed out of the boundary. When the geofence notification unit 326 receives such a notification, the geofence notification unit 326 can request the present latitude and longitude of the user computing device to determine where the geofence boundary was crossed.

In some instances, the trigger monitoring unit 310 of the software application will note that crossing the boundary of the geofence has satisfied a trigger condition for presenting a user with a message. In that instance, the message trigger unit 306 will then instruct the messaging unit 312 to cause a message to be displayed to the user.

In alternate embodiments, when the geofence notification unit 326 receives a notification from the operating system that a geofence boundary has been crossed, a trigger notification unit 328 sends a trigger message to the geofence trigger determination unit 242 of a geofencing unit 229 of a customer engagement service 50. The trigger message indicates which geofence boundary was crossed, whether the mobile computing device crossed into or out of the geofence boundary, and possibly when the geofence boundary was crossed and at what specific location it was crossed. The geofence trigger determination unit 242 then determines if this activity is sufficient to cause a message to be displayed to the user of the mobile computing device. If so, an element of the message sending unit 220 of the customer engagement service 50 acts to cause the message to be presented to the user.

With the above as background, we will now discuss various methods performed by a client's software application on a mobile computing device and by elements of a customer engagement service to provide updated geofencing information to a client's software application, and to use that geofencing information to cause a message to be presented to a user because the user's mobile computing device crossed the boundary of a geofence.

Figure 5:
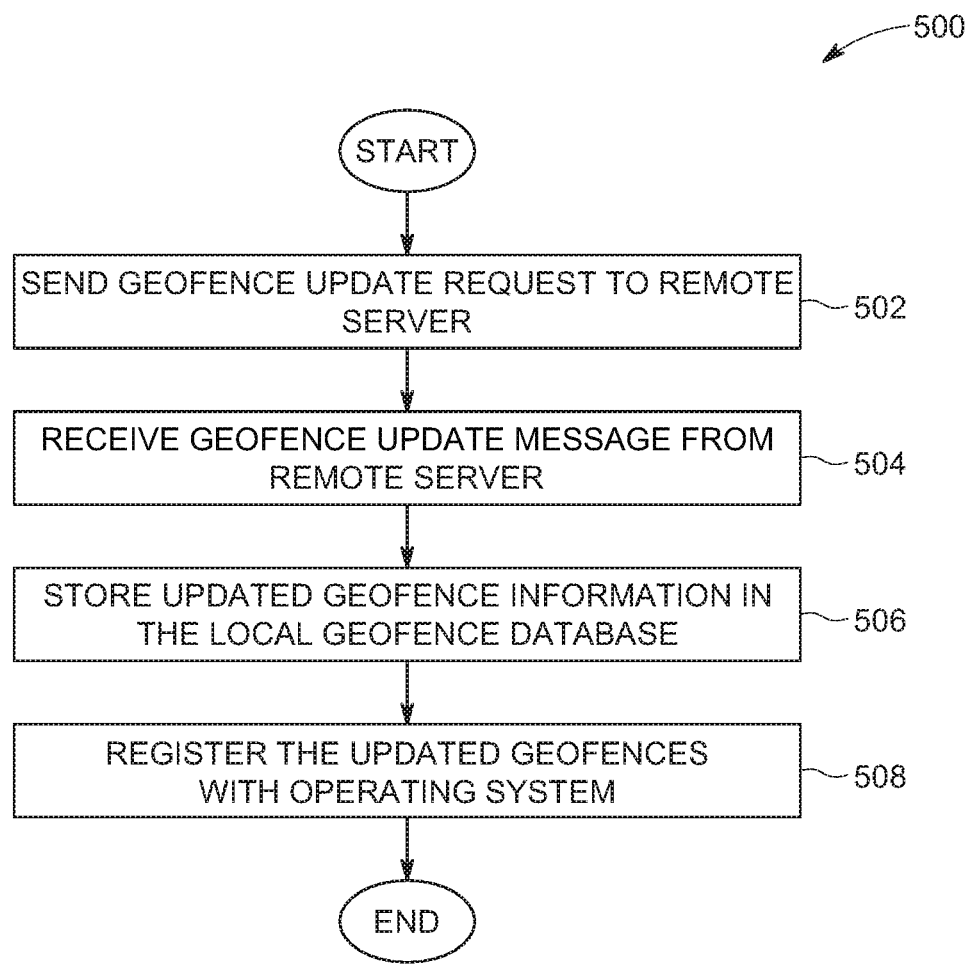
FIG. 5 is a flowchart illustrating steps of a first method embodying the invention that would be performed by elements of a software application on a user computing device.
Figure 6:
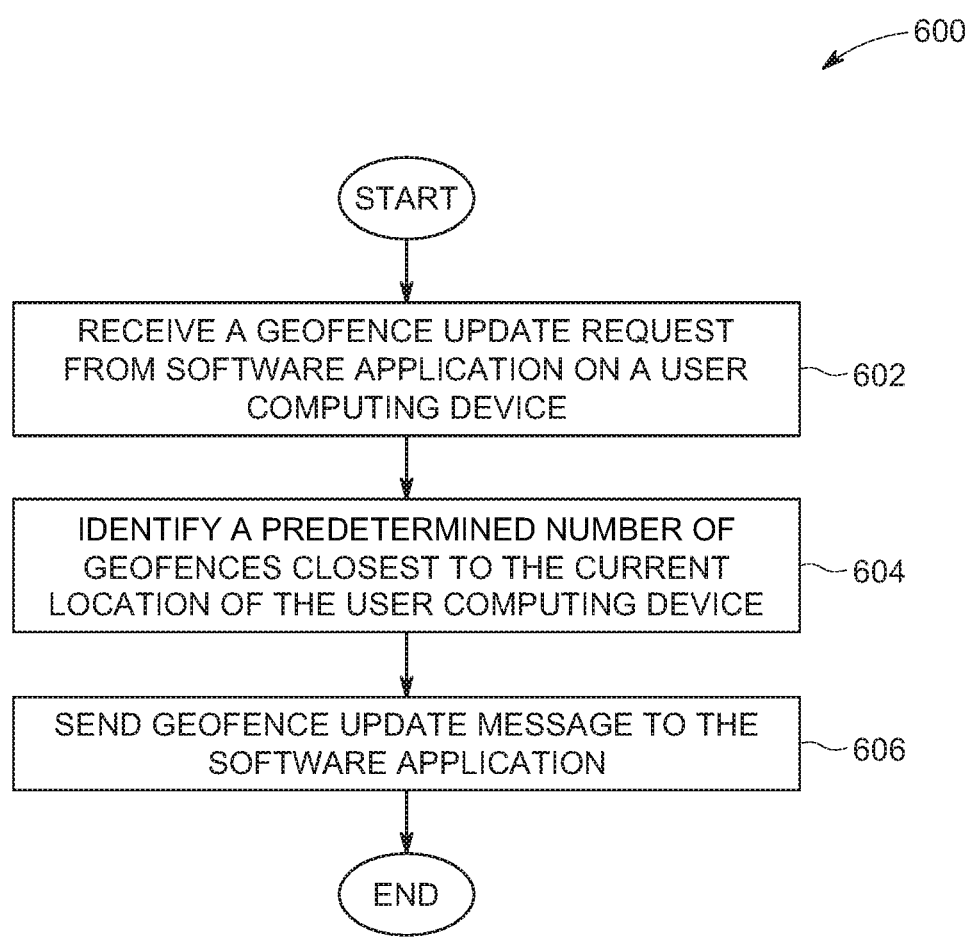
FIG. 6 is a flowchart illustrating steps of a second method embodying the invention that would be performed by elements of a customer engagement service.

FIG. 5 illustrates steps of a method performed by elements of a client's software application on a mobile computing device to update geofence information. FIG. 6 illustrates steps of a method performed by elements of a customer engagement service during this geofence data update process. The methods illustrated in FIGS. 5 and 6 will be discussed together to provide a comprehensive explanation of what occurs during the update process.

The method 500 illustrated in FIG. 5 begins and proceeds to step 502 where a geofencing unit 320 of a client's software application 300 on a mobile computing device sends a geofence update request to a geofence update unit 236 of a customer engagement service 50. The geofence update request will include the current location of the mobile computing device. The location could be expressed at a latitude and longitude, or in some other fashion. The geofence update request may also indicate that the user's mobile computing device is moving, and if so, in what direction and how fast. The geofence update request could be sent periodically, such as once a day at a predetermined time. Alternatively, the geofence update request could be sent when the software application 300 is opened, or when the software application 300 is brought to the foreground of the operating system of the mobile computing device. In still other instances, the generation of the geofence update request could be triggered because the user's mobile computing device has moved a predetermined distance since the last update was performed.

The method 600 illustrated in FIG. 6 begins and proceeds to step 602, where the geofence update unit 236 of the geofence unit 229 of the customer engagement service 50 receives the geofence update request sent from the client software application 300. In step 604, the geofence identification unit 238 of the geofence update unit 236 identifies the geofences that are being tracked in connection with the client's software application 300 that are closest to the current location of the mobile computing device. If the geofence update request indicates that the user's mobile computing device is moving, the geofence identification unit 238 may also identify some geofences that lie along the path of travel of the mobile computing device. Because the operating system of the mobile computing device will only allow a predetermined number of geofences to be registered with the operating system, the geofence identification unit 238 need only identify the same predetermined number of geofences that are closest to the mobile computing device's current location and/or that lie along a path of travel of the mobile computing device.

The method 600 then proceeds to step 606, where the geofence update message sending unit 240 of the geofencing unit 229 sends a geofence update message to the software application 300 on the mobile computing device. The geofence update message will include the identifiers and boundary information for each of the predetermined number of geofences identified by the geofence identification unit 238. The geofence boundary information may be expressed as a latitude and longitude of the center of the geofence, and a radius of the geofence. Of course, the boundary information could be expressed in other ways. Further, the information included in the geofence update message may also include a cooldown period, the significance of which is discussed in greater detail below. The method 600 illustrated in FIG. 6 then ends.

Returning now to the method 500 illustrated in FIG. 5, in step 504 the geofencing unit 320 of the software application on the mobile computing device receives the geofence update message. In step 606, information on the updated geofences contained in the received geofence update message is stored in the local geofence database 322. In step 608, the geofence registration unit 324 registers the predetermined number of geofences listed in the geofence update message with the operating system of the mobile computing device. The method then ends.

Figure 7:
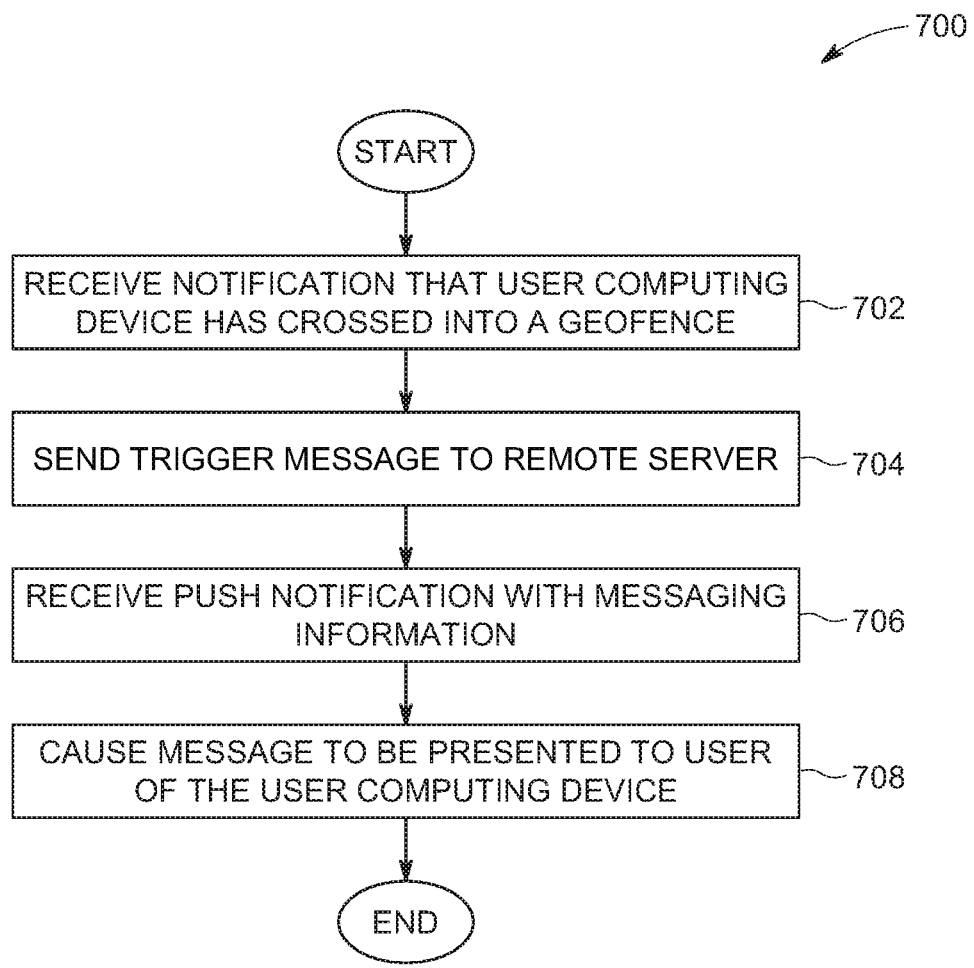
FIG. 7 is a flowchart illustrating steps of a third method embodying the invention that would be performed by elements of a software application on a user's computing device.
Figure 8:
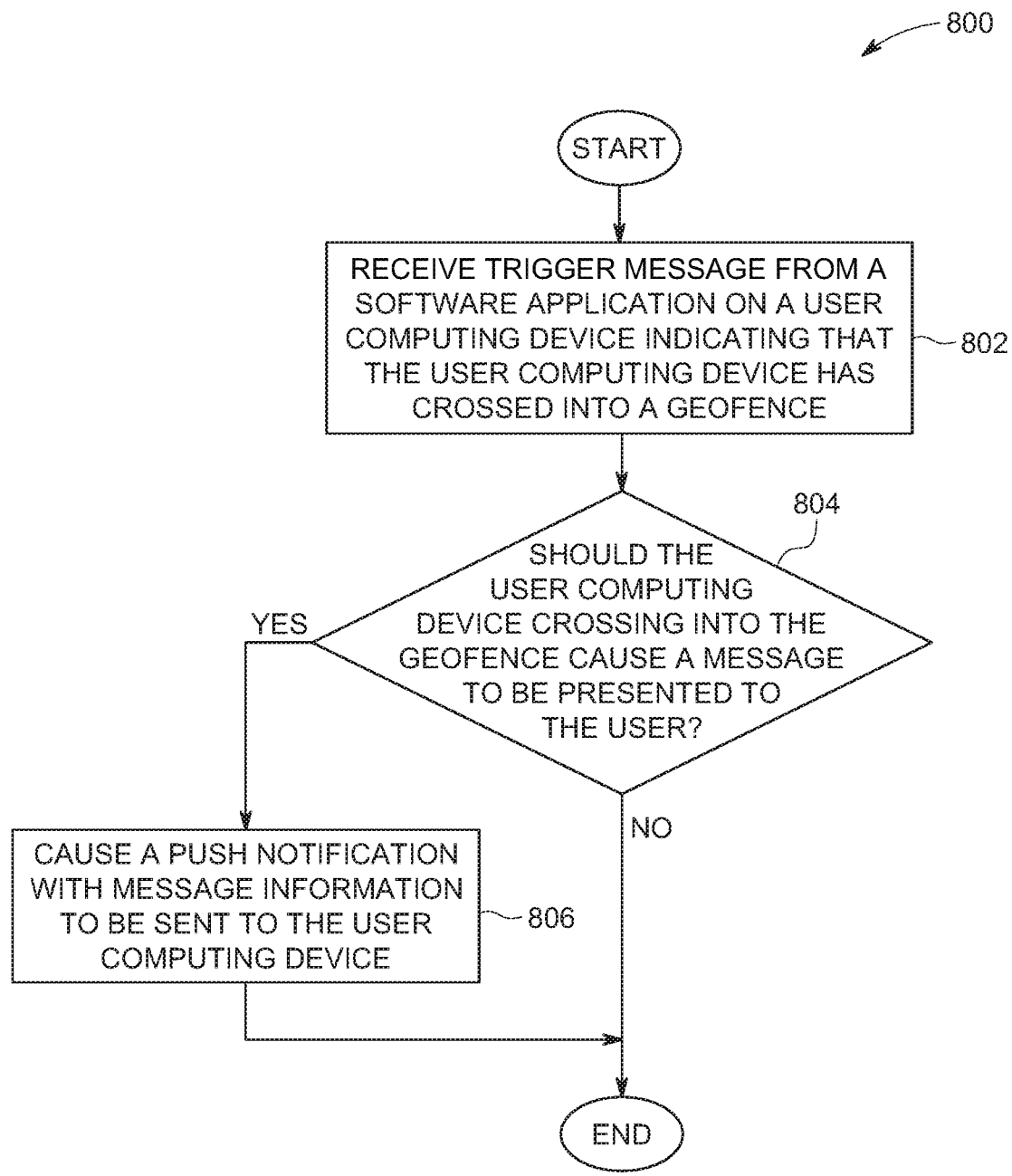
FIG. 8 is a flowchart illustrating steps of a fourth method embodying the invention that would be performed by elements of a customer engagement service.

FIG. 7 depicts steps of a method performed by elements of a client's software application on a mobile computing device to present a user with a message when the user's mobile computing device crosses the boundary of a geofence. FIG. 8 depicts steps of a method performed by elements of a customer engagement service as part of the overall process of causing the message to be presented to the user. In this overall process, the ultimate decision about whether to present the user with the message is made by elements of the customer engagement service 50. The two methods are discussed together to provide a comprehensive description of the overall process.

The method 700 illustrated in FIG. 7 begins and proceeds to step 702 where a geofence notification unit 326 of the geofencing unit 320 of the software application 300 receives a notification from the operating system that the mobile computing device has crossed the boundary of a registered geofence. Next, in step 704, the trigger notification unit 328 of the geofencing unit 320 sends a trigger message to the geofence trigger determination unit 242 of the geofencing unit 229 of the customer engagement service 50. The trigger message will include the identifier of the geofence boundary that was crossed.

Turning now to FIG. 8, the method 800 begins and proceeds to step 802 where the geofence trigger determination unit 242 receives the trigger message from the trigger notification unit 328. In step 804 the geofence trigger determination unit 242 determines whether the crossing of the boundary of the geofence by the mobile computing device is sufficient to cause a message to be presented to the user. This step could be performed in consultation with elements of the message sending unit 220 of the customer engagement service 50, which may have information about the trigger conditions that must be satisfied for a particular message to be presented to the user.

If the determination made in step 804 indicates that the crossing of the geofence boundary is not sufficient to cause a message to be presented to the user, the method ends. If the determination made in step 804 indicates that crossing the boundary of the geofence is a sufficient condition to cause a message to be presented to the user, the method proceeds to step 806, where a push notification sending unit 221 of the message sending unit 220 causes a push notification with messaging information to be sent to the software application 300 on the mobile computing device. The push notification can be a silent push notification that contains messaging instructions.

The messaging instructions in the push notification could include the message that is to be presented to the user. In other instances, the push notification could instruct the software application to cause a previously sent and stored message to be presented to the user. In still other instances, the messaging information could include information that is to be inserted into a messaging template by a message generation unit 316 of the software application 300 to generate the message that is ultimately to be presented to the user. Once the push notification sending unit 221 causes the push notification to be sent, the method 800 illustrated in FIG. 8 ends.

Returning now to FIG. 7, in step 706 a push notification receiver 303 of the software application receives the push notification with the messaging information. In step 708, the messaging unit 312 acts in accordance with the messaging information to cause the desired message to be presented to the user. As mentioned above, the messaging information could include the message itself, which would allow the message presenting unit 318 to present the message to the user. In other instances, the message generation unit 316 could use the messaging information in the push notification to generate the message, which is then presented to the user by the message presenting unit 318. In still other instances, the message generation unit 316 could use the messaging information in the received push notification, and information obtained by a user-specific information acquisition unit 314 to generate the message that is to be presented to the user. Once the message has been presented to the user, the method 700 ends.

Figure 9:
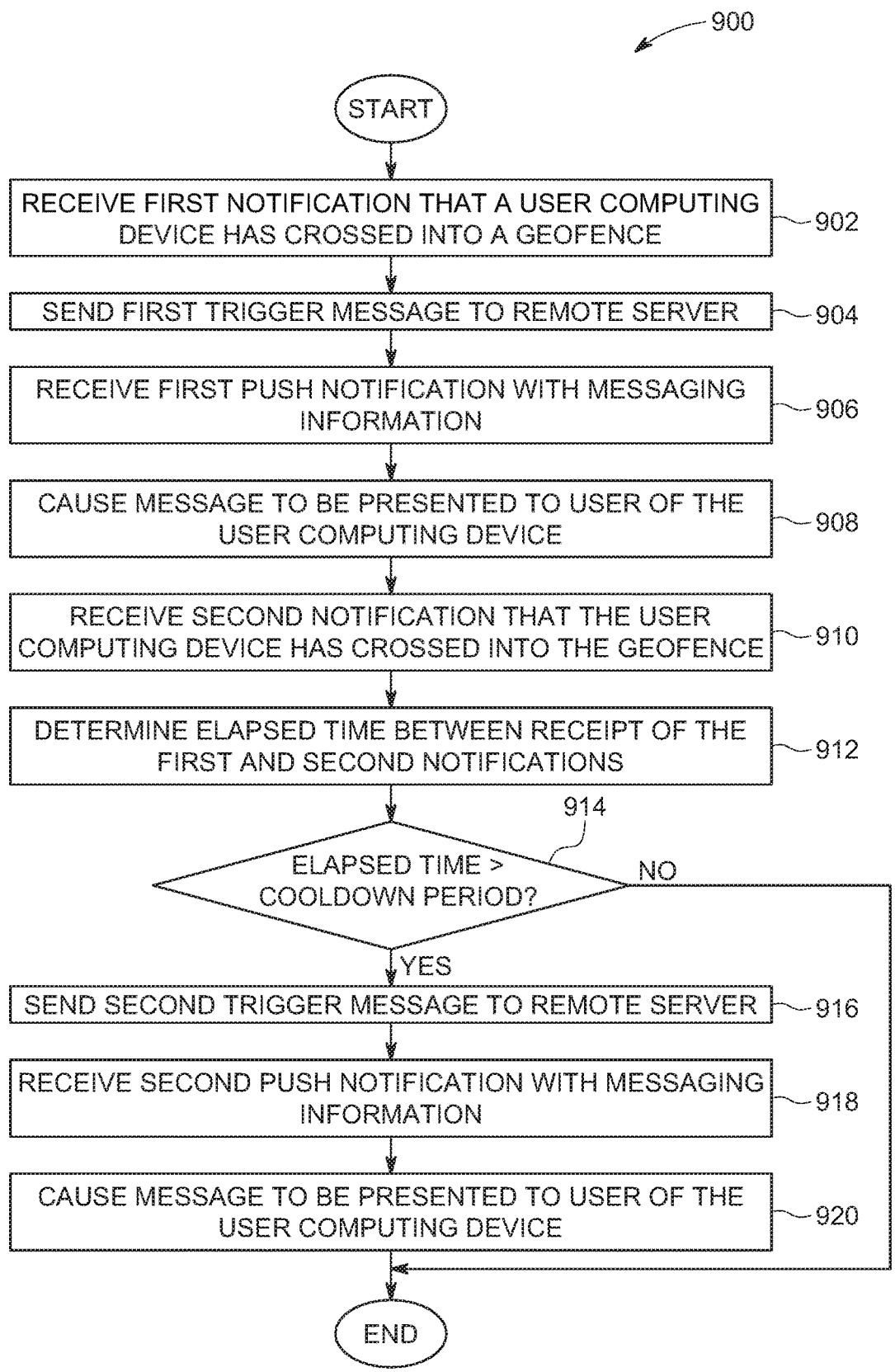
FIG. 9 is a flowchart illustrating steps of a fifth method embodying the invention that would be performed by elements of a software application on a user computing device.

FIG. 9 illustrates steps of another method that would be performed by elements of a client's software application on a mobile computing device to cause one or more messages to be presented to a user because the user's mobile computing device crosses the boundary of a geofence. This method attempts to deal with a situation where the user is crossing back and forth across the boundary of a geofence multiple times over a relatively short period of time. The aim of the method is to prevent the same or a similar message from being presented to the user multiple times over a short period of time because the user's mobile computing device crosses the boundary of the geofence multiple times in a relative short period of time.

The method 900 illustrated in FIG. 9 begins and proceeds to step 902 where a geofence notification unit 326 of the geofencing unit 320 of the software application 300 receives a first notification from the operating system that the mobile computing device has crossed into the boundary of a registered geofence. Next, in step 904, the trigger notification unit 328 of the geofencing unit 320 sends a trigger message to the geofence trigger determination unit 242 of the geofencing unit 229 of the customer engagement service 50. The trigger message will include the identifier of the geofence boundary that was crossed.

In step 906 a push notification receiver 303 of the software application receives a push notification with messaging information instructing the software application 300 to present the user with a message. In step 908, the messaging unit 312 acts in accordance with the messaging information to cause the desired message to be presented to the user.

Next, in step 910, the geofence notification unit 326 receives a second notification from the operating system indicating that the mobile computing device has passed back into the boundary of the geofence. Note, the geofence notification unit 326 may also have received an earlier notification from the operating system indicating that the mobile computing device passed outside the boundary of the geofence, although that step is optional.

In step 912, the geofence notification unit 326 determines the length of time that elapsed between receipt of the first notification message indicating the mobile computing device passed inside the boundary of the geofence and receipt of the second message indicating that the mobile computing device passed inside the boundary of the geofence. In step 914, a check is performed to determine if the elapsed time between receipt of the first and second notification messages is greater than a predetermined cooldown period. If not, the method ends and no further message is displayed to the user.

If the elapsed time is greater than the predetermined cooldown period, then the method proceeds to step 916 where the trigger notification unit 328 of the geofencing unit 320 sends a second trigger message to the geofence trigger determination unit 242 of the geofencing unit 229 of the customer engagement service 50. In step 918 a push notification receiver 303 of the software application receives a second push notification with messaging information instructing the software application 300 to present the user with a message. In step 920, the messaging unit 312 acts in accordance with the messaging information to cause the desired message to be presented to the user. The method then ends.

In a method as depicted in FIG. 9, if only a short period of time elapses between receiving the first and second notifications that the mobile computing device has passed inside the boundary of the geofence, the method prevents the user from receiving duplicative messaging. If a sufficiently long period of time elapses between receipt of the first and second notification messages from the operating system, the method operates to cause a new message to be presented to the user. The second message could be the same as the first message, or the message sending unit 220 of the customer engagement service 50 may act to cause a different second message to be presented to the user.

Figure 10:
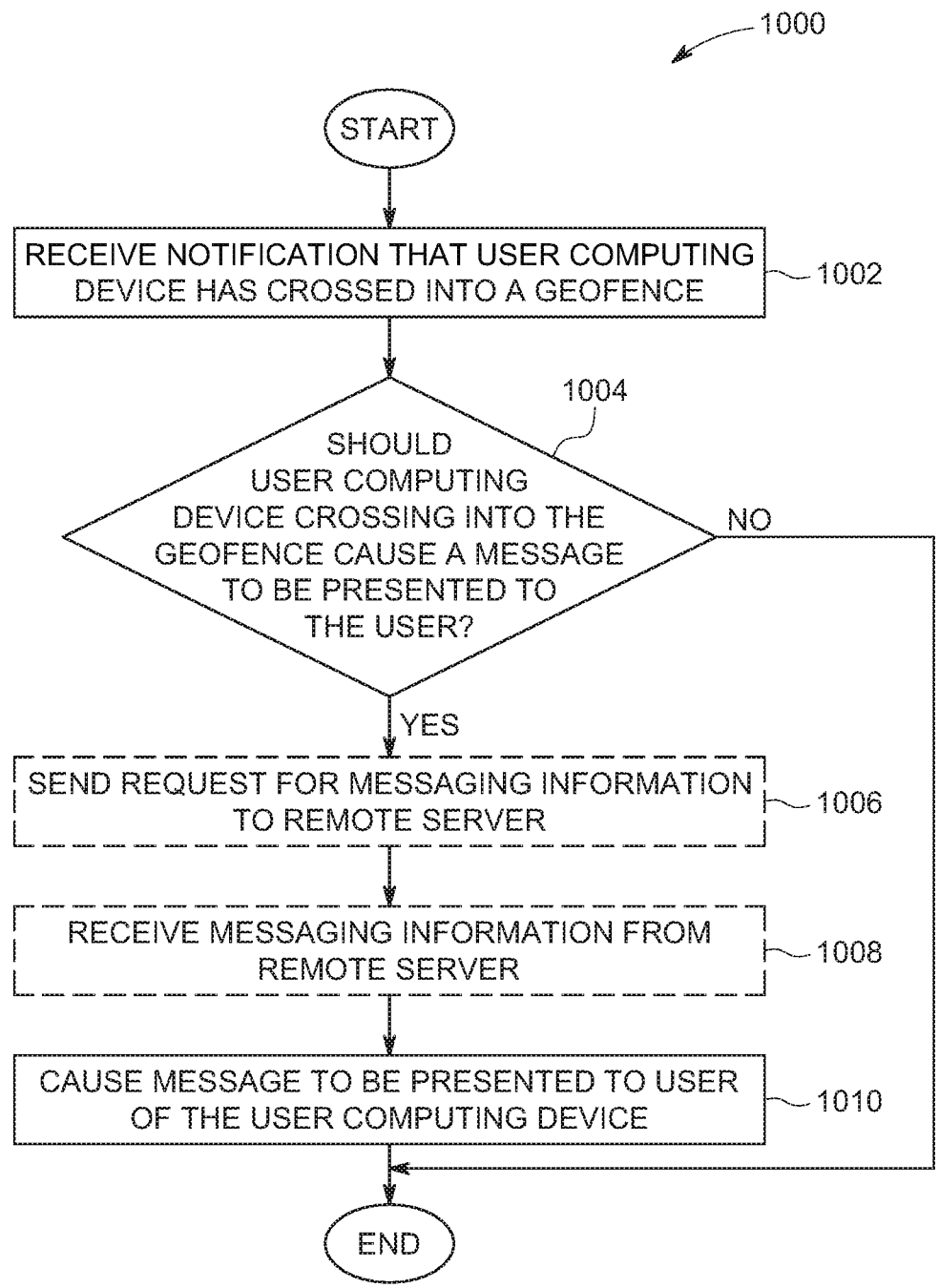
FIG. 10 is a flowchart illustrating steps of a sixth method embodying the invention that would be performed by elements of a software application on a user computing device.

FIG. 10 depicts steps of another method embodying the invention that would be performed by elements of a client's software application on a user's mobile computing device. In the methods discussed above, the decision about whether to present a message to a user after the user's mobile computing device crossed a boundary of a geofence was made by elements of the customer engagement service. In the method depicted in FIG. 10, this decision is made locally by the software application itself.

The method 1000 begins and proceeds to step 1002, where the geofence notification unit 326 of the software application receives a notification from the operating system of the mobile computing device indicating that the mobile computing device has crossed a boundary of one of the registered geofences. In step 1004, the message trigger unit 306 checks to determine if the crossing of the geofence boundary is a sufficient cause for presenting the user with a message. In this instance, the message trigger unit 306 would have already received information about a message that is to be presented to the user when the geofence boundary has been crossed.

If the check performed in step 1004 indicates that the message should not yet be presented to the user, the method ends. This could occur if there are other trigger conditions that must also be satisfied, in addition to crossing the geofence boundary, before the message is presented to the user.

If the check performed in step 1004 indicates that a message should be presented to the user, the method proceeds to optional step 1006, where the messaging unit 312 requests messaging information from an element of the message sending unit 220 of the customer engagement service 50. When optional step 1006 is performed, optional step 1008 is also performed, and the messaging unit 312 receives messaging information back from the message sending unit 220. The messaging information could be sent to the messaging unit 312 as part of a data communication or as part of a received push notification. In step 1010 the message presenting unit 318 then causes the message to be presented to the user. The method then ends.

Note, if information sufficient to present the message has previously been communicated to the software application 300, optional steps 1006 and 1008 need not be performed. Also, in some instances, the message generation unit 316 may need to generate the message, perhaps with the assistance of the user-specific information acquisition unit 314 before the message can be presented to the user in step 1010.

The present invention may be embodied in methods, apparatus, electronic devices, and/or computer program products. Accordingly, the invention may be embodied in hardware and/or in software (including firmware, resident software, micro-code, and the like), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus or device. More specific examples (a non-exhaustive list) of the computer-readable medium include the following: hard disks, optical storage devices, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object-oriented programming language, such as JavaScript, Java®, Swift or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Figure 11:
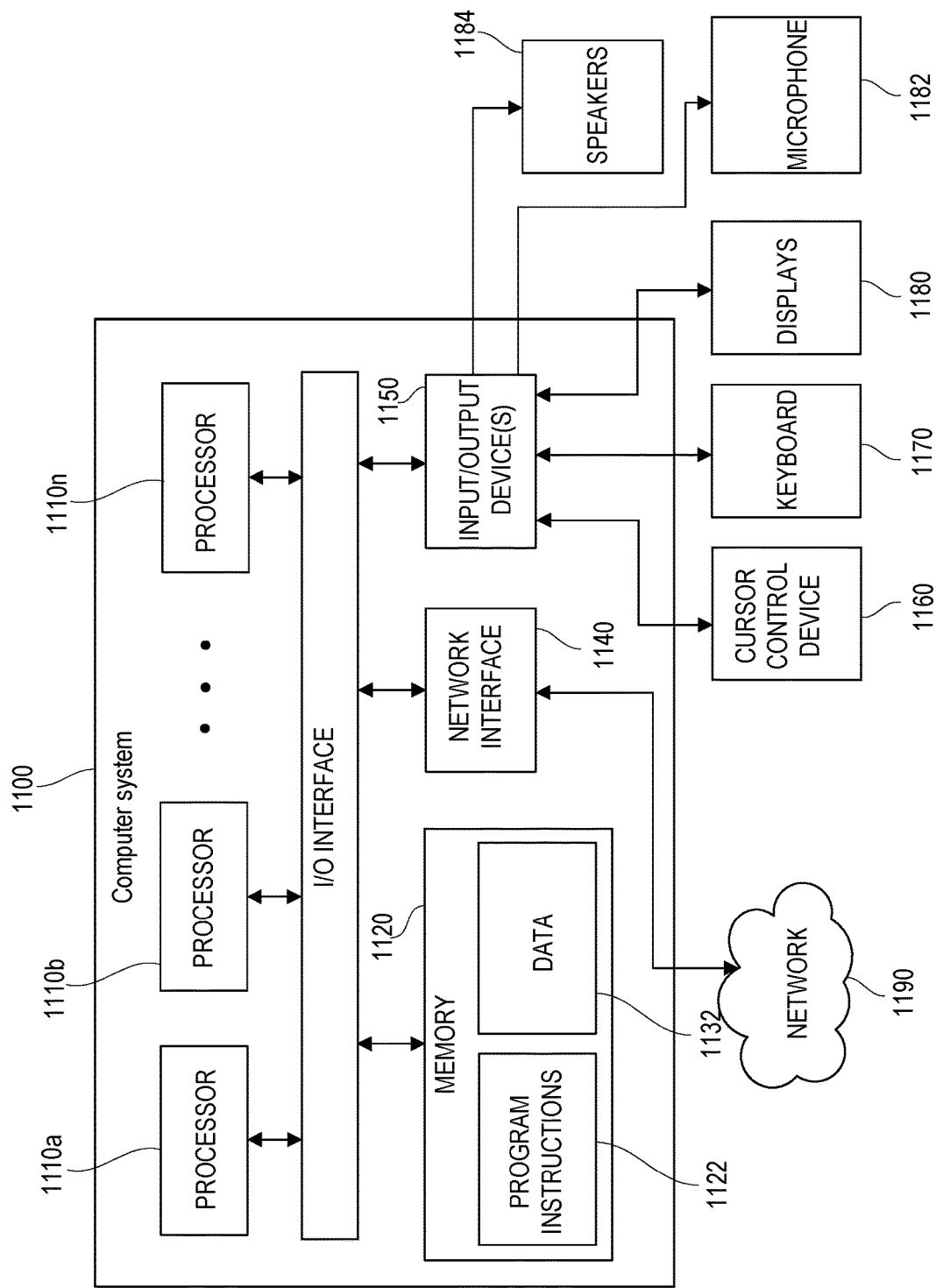
FIG. 11 is a diagram of a computer system and associated peripherals which could embody the invention, or which could be used to practice methods embodying the invention.

FIG. 11 depicts a computer system 1100 that can be utilized in various embodiments of the present invention to implement the invention according to one or more embodiments. The various embodiments as described herein may be executed on one or more computer systems, which may interact with various other devices. One such computer system is the computer system 1100 illustrated in FIG. 11. The computer system 1100 may be configured to implement the methods described above. The computer system 1100 may be used to implement any other system, device, element, functionality or method of the above-described embodiments. In the illustrated embodiments, the computer system 1100 may be configured to implement the disclosed methods as processor-executable executable program instructions 1122 (e.g., program instructions executable by processor(s) 1110) in various embodiments.

In the illustrated embodiment, computer system 1100 includes one or more processors 1110a-1110n coupled to a system memory 1120 via an input/output (I/O) interface 1130. Computer system 1100 further includes a network interface 1140 coupled to I/O interface 1130, and one or more input/output devices 1150, such as cursor control device 1160, keyboard 1170, display(s) 1180, microphone 1182 and speakers 1184. In various embodiments, any of the components may be utilized by the system to receive user input described above. In various embodiments, a user interface may be generated and displayed on display 1180. In some cases, it is contemplated that embodiments may be implemented using a single instance of computer system 1100, while in other embodiments multiple such systems, or multiple nodes making up computer system 1100, may be configured to host different portions or instances of various embodiments. For example, in one embodiment some elements may be implemented via one or more nodes of computer system 1100 that are distinct from those nodes implementing other elements. In another example, multiple nodes may implement computer system 1100 in a distributed manner.

In different embodiments, the computer system 1100 may be any of various types of devices, including, but not limited to, a personal computer system, desktop computer, laptop, notebook, or netbook computer, a portable computing device, a mainframe computer system, handheld computer, workstation, network computer, a smartphone, a camera, a set top box, a mobile device, a consumer device, video game console, handheld video game device, application server, storage device, a peripheral device such as a switch, modem, router, or in general any type of computing or electronic device.

In various embodiments, the computer system 1100 may be a uniprocessor system including one processor 1110, or a multiprocessor system including several processors 1110 (e.g., two, four, eight, or another suitable number). Processors 1110 may be any suitable processor capable of executing instructions. For example, in various embodiments processors 1110 may be general-purpose or embedded processors implementing any of a variety of instruction set architectures (ISAs). In multiprocessor systems, each of processors 1110 may commonly, but not necessarily, implement the same ISA.

System memory 1120 may be configured to store program instructions 1122 and/or data 1132 accessible by processor 1110. In various embodiments, system memory 1120 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 1120. In other embodiments, program instructions and/or data may be received, sent or stored upon different types of computer-accessible media or on similar media separate from system memory 1120 or computer system 1100.

In one embodiment, I/O interface 1130 may be configured to coordinate I/O traffic between processor 1110, system memory 1120, and any peripheral devices in the device, including network interface 1140 or other peripheral interfaces, such as input/output devices 1150. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments some or all of the functionality of I/O interface 1130, such as an interface to system memory 1120, may be incorporated directly into processor 1110.

Network interface 1140 may be configured to allow data to be exchanged between computer system 1100 and other devices attached to a network (e.g., network 1190), such as one or more external systems or between nodes of computer system 1100. In various embodiments, network 1190 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1140 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices 1150 may, in some embodiments, include one or more display terminals, keyboards, keypads, touchpads, scanning devices, voice or optical recognition devices, or any other devices suitable for entering or accessing data by one or more computer systems 1100. Multiple input/output devices 1150 may be present in computer system 1100 or may be distributed on various nodes of computer system 1100. In some embodiments, similar input/output devices may be separate from computer system 1100 and may interact with one or more nodes of computer system 1100 through a wired or wireless connection, such as over network interface 1140.

In some embodiments, the illustrated computer system may implement any of the operations and methods described above, such as the methods illustrated by the flowcharts of FIGS. 5-10. In other embodiments, different elements and data may be included.

Those skilled in the art will appreciate that the computer system 1100 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 1100 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1100 may be transmitted to computer system 1100 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of updating and using geofence data that is performed by a software application on a user computing device, the method comprising:
   sending a geofence update request to a first remote server of a customer engagement service, the geofence update request including the current position of the user computing device;
   receiving from the first remote server a geofence update message that includes a predetermined number of geofence data items, where each geofence data item defines the boundary of a geofence, and wherein the predetermined number of geofence data items are for geofences that are being maintained by the customer engagement service in connection with the software application and that are close to the current position of the user computing device;
   registering the predetermined number of geofence data items with an operating system of the user computing device;
   receiving a first notification from the operating system when the user computing device crosses into a first one of the geofences defined by one of the geofence data items, where the notification identifies the first geofence; and
   sending a first trigger message to a second remote server of the customer engagement service that indicates that the user computing device has crossed into the first geofence;
   receiving a second notification from the operating system when the user computing device exits the first geofence;
   receiving a third notification from the operating system when the user computing device crosses back into first geofence;
   determining a period of time that elapsed between receipt of the first notification message and receipt of the third notification message; and
   sending a second trigger message to the second remote server of the customer engagement service that indicates that the user computing device has crossed back into the first geofence only when the determined period of time is greater than a cooldown period.

2. The method of claim 1, wherein the geofence update request indicates that the user computing device is moving, and wherein at least some of the predetermined number of geofence data items are for geofences that lie along a path of travel of the user computing device.

3. The method of claim 1, wherein the predetermined number of geofence data items are registered with the operating system in reverse order of a distance between the current position of the user computing device and the location of each geofence.

4. The method of claim 1, further comprising:
   receiving a push notification, or information contained in a push notification, that the customer engagement service caused to be sent to the user computing device in response to receipt of the first trigger message, where the push notification includes messaging information; and
   causing a message to be presented to a user of the user computing device based on the messaging information in the received push notification.

5. The method of claim 4, wherein information in the received push notification or the push notification itself is provided to the software application on the user computing device, and wherein causing a message to be presented to the user of the user computing device comprises the software application causing an in-application message to be presented to the user.

6. The method of claim 5, wherein receiving a push notification, or information contained in a push notification, comprises receiving a silent push notification or receiving information that was contained in a silent push notification.

7. The method of claim 1, further comprising:
   determining whether the user computing device crossing into the first geofence should cause a message to be presented to the user of the user computing device; and
   causing a message to be presented to a user of the user computing device when it is determined that the user computing device crossing into the first geofence should cause the message to be presented to the user of the user computing device.

8. The method of claim 7, wherein the step of sending a first trigger message to the second remote server of the customer engagement service comprises requesting messaging information from a second remote server of the customer engagement service
   and wherein the method further comprises receiving messaging information from the second remote server, and wherein the step of causing a message to be presented to the user comprises causing a message generated with the received messaging information to be presented to the user.

9. A system for updating and using geofence data within a software application running on a user computing device, comprising:
   means for sending a geofence update request to a first remote server of a customer engagement service, the geofence update request including the current position of the user computing device;
   means for receiving from the first remote server a geofence update message that includes a predetermined number of geofence data items, where each geofence data item defines the boundary of a geofence, and wherein the predetermined number of geofence data items are for geofences that are being maintained by the customer engagement service in connection with the software application and that are close to the current position of the user computing device;
   means for registering the predetermined number of geofence data items with an operating system of the user computing device
   means for receiving a second notification from the operating system when the user computing device exits the first geofence;
   means for receiving a third notification from the operating system when the user computing device crosses back into first geofence;
   means for determining a period of time that elapsed between receipt of the first notification message and receipt of the third notification message; and
   means for sending a second trigger message to the second remote server of the customer engagement service that indicates that the user computing device has crossed back into the first geofence only when the determined period of time is greater than a cooldown period.

10. A system for updating and using geofence data within a software application running on a user computing device, comprising:
    a geofencing unit that:
    sends a geofence update request to a first remote server of a customer engagement service, the geofence update request including the current position of the user computing device;

receives from the first remote server a geofence update message that includes a predetermined number of geofence data items, where each geofence data item defines the boundary of a geofence, and wherein the predetermined number of geofence data items are for geofences that are being maintained by the customer engagement service in connection with the software application and that are close to the current position of the user computing device; and a geofence registration unit that registers the predetermined number of geofence data items with an operating system of the user computing device;

a geofence notification unit that receives a first notification from the operating system when the user computing device crosses into a first one of the geofences defined by one of the geofence data items, where the notification identifies the first geofence; and a trigger notification unit that sends a first trigger message to a second remote server of the customer engagement service that indicates that the user computing device has crossed into the first geofence wherein the geofence notification unit receives a second notification from the operating system when the user computing device exits the first geofence, receives a third notification from the operating system when the user computing device crosses back into first geofence, and determines a period of time that elapsed between receipt of the first notification message and receipt of the third notification message; and wherein the trigger notification unit sends a second trigger message to the second remote server of the customer engagement service that indicates that the user computing device has crossed back into the first geofence only when the determined period of time is greater than a cooldown period.

11. The system of claim 10, wherein the geofence update request indicates that the user computing device is moving, and wherein at least some of the predetermined number of geofence data items are for geofences that lie along a path of travel of the user computing device.

12. The system of claim 10, wherein the geofence registration unit registers the predetermined number of geofence data items with the operating system in reverse order of a distance between the current position of the user computing device and the location of each geofence.

13. The system of claim 10, further comprising:

a push notification receiver that receives a push notification, or information contained in a push notification, that the customer engagement service caused to be sent to the user computing device in response to receipt of the first trigger message, where the push notification includes messaging information; and a messaging unit that causes a message to be presented to a user of the user computing device based on the messaging information in the received push notification.

14. The system of claim 13, wherein the messaging unit causes an in-application message to be presented to the user.

15. The system of claim 14, wherein the push notification receiver receives a silent push notification or information that was contained in a silent push notification.

16. The system of claim 10, wherein the message trigger unit determines whether the user computing device crossing into the first geofence should cause a message to be presented to the user of the user computing device and further comprising a messaging unit that causes a message to be presented to a user of the user computing device when the message trigger unit determines that the user computing device crossing into the first geofence should cause the message to be presented to the user of the user computing device.

17. The system of claim 16, wherein first trigger message requests messaging information from the second remote server of the customer engagement service when the message trigger unit determines that the user computing device crossing into the first geofence should cause a message to be presented to the user of the user computing device, wherein the messaging unit receives messaging information from the second remote server, and wherein the message that is presented to the user is generated by the messaging unit using the received messaging information.

\* \* \* \* \*